Figure 19:
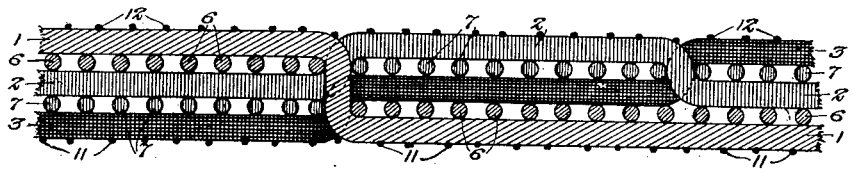

No. 710,775. Patented Oct. 7, 1902.
H. HARDWICK.
WOVEN FABRIC.
(Application filed Mar. 20, 1902.)
(No Model.) 4 Sheets—Sheet 1.
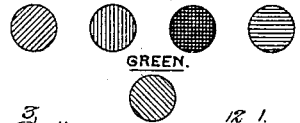
Fig. 1.
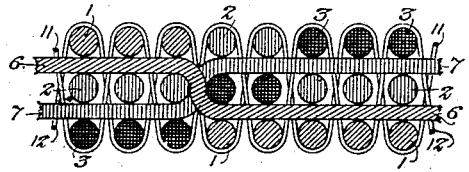
Fig. 2.
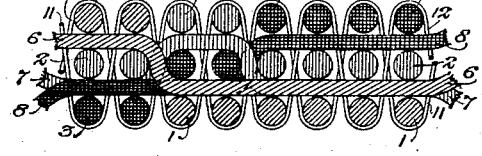
Fig. 3.
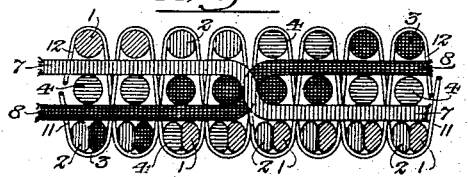
Fig. 4.
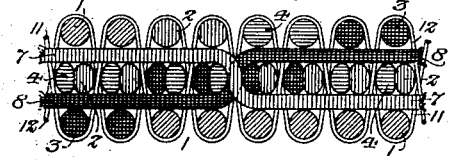
Fig. 5.
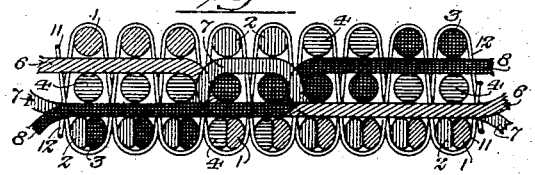
Fig. 6.
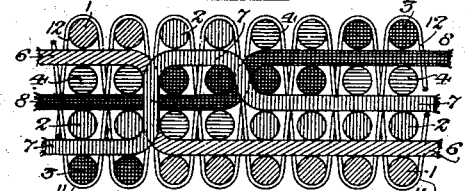
Fig. 7.
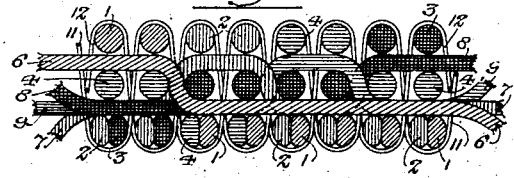
Fig. 8.
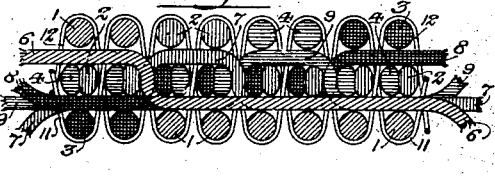
Fig. 9.
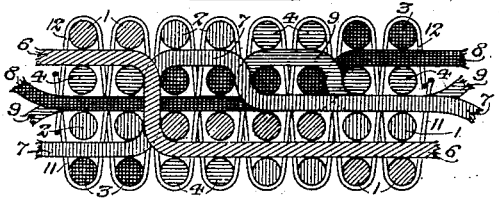
Fig. 10.
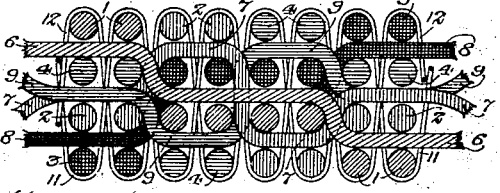
Fig. 11.
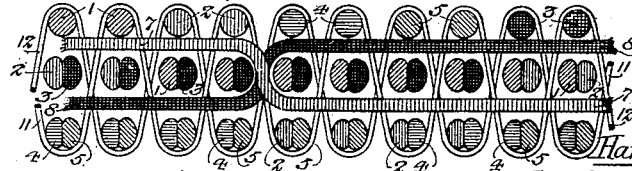
Witnesses:—
Louis M. Whitehead
Herman E. Metius.
Inventor:—
Harry Hardwick
by his Attorneys:—
Howson & Howson No. 710,775. Patented Oct. 7, 1902.
H. HARDWICK.
WOVEN FABRIC.
(Application filed Mar. 20, 1902.)
(No Model.) 4 Sheets—Sheet 2.
Fig. 12.
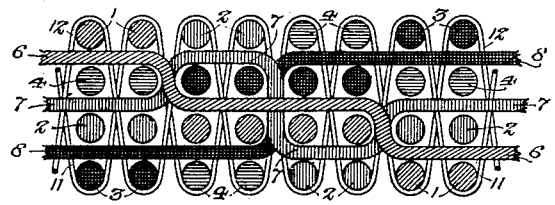
Fig. 13.
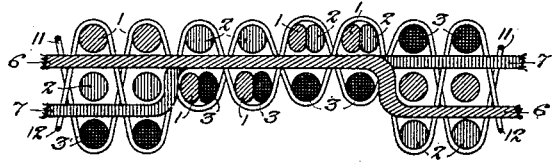
Fig. 14.
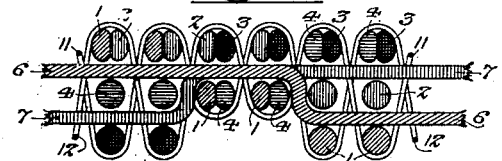
Fig. 15.
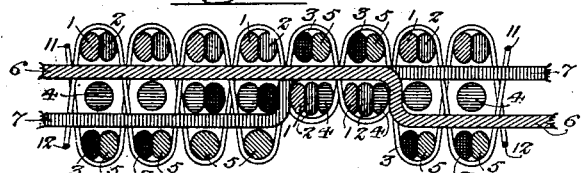
Fig. 16.
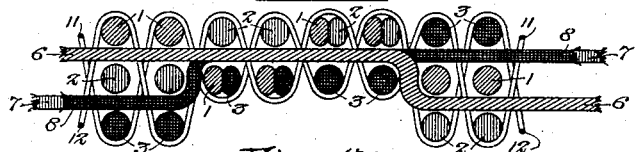
Fig. 17.
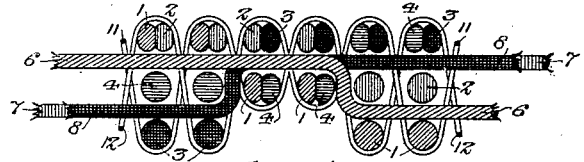
Fig. 18.
Witnesses:—
Louis M. T. Whitehead.
Herman E. Metius.
Inventor:—
Harry Hardwick
by his Attorneys
Howson & Howson
THE NORRIS PETERS CO., PHOTO-LITHO., WASHINGTON, D. C.

No. 710,775. Patented Oct. 7, 1902.

H. HARDWICK.
WOVEN FABRIC.
(Application filed Mar. 20, 1902.)

(No Model.) 4 Sheets—Sheet 3.

Witnesses:— Inventor.
Harry Hardwick
by his Attorneys

No. 710,775. 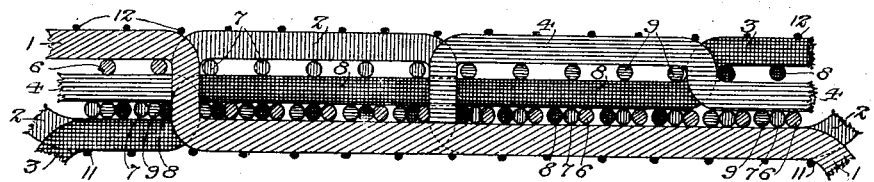
Patented Oct. 7, 1902.
H. HARDWICK.
WOVEN FABRIC.
(Application filed Mar. 20, 1902.)
(No Model.)
4 Sheets—Sheet 4.
Witnesses:—
Louis M. F. Whitehead.
Herman E. Metius.
Inventor:—
Harry Hardwick.
by his Attorneys:—
Howson & Howson
THE NORRIS PETERS CO., PHOTO-LITHO., WASHINGTON, D. C.

UNITED STATES PATENT OFFICE.

HARRY HARDWICK, OF PHILADELPHIA, PENNSYLVANIA, ASSIGNOR TO IVINS, DIETZ & METZGER COMPANY, OF PHILADELPHIA, PENNSYLVANIA, A CORPORATION OF PENNSYLVANIA.

WOVEN FABRIC.

SPECIFICATION forming part of Letters Patent No. 710,775, dated October 7, 1902.

Application filed March 20, 1902. Serial No. 99,164. (No model.)

*To all whom it may concern:*

Be it known that I, HARRY HARDWICK, a citizen of the United States, residing in Philadelphia, Pennsylvania, have invented certain Improvements in Woven Fabrics, of which the following is a specification.

My invention consists of a woven fabric of the ingrain type in which pattern-forming weft-threads are combined with tying or binding warp-threads and also with certain stuffer warp-threads in such manner as to form a multiple-ply fabric wherein the plies are firmly bound together at all points and wherein also the stuffer warp-threads are visible to a certain extent between the weft-threads on one or both faces of the fabric, so that they can be used with modifying effect upon the coloring of the pattern and will lessen or wholly prevent the "grinning" or "gazing" between the surface-threads of other weft-threads lying behind the same.

In the accompanying drawings, Figures 1 to 18, inclusive, are sections taken in the direction of the warp-threads and showing various forms of fabric made in accordance with my invention; and Figs. 19 to 29 are sections taken in the direction of the weft-threads of the fabrics shown in Figs. 1 to 11, respectively.

The fabric comprises repetitions of sets of weft-threads, each set comprising three or more, and repetitions of sets of binder warp-threads and stuffer warp-threads, each set of binder warp-threads comprising a pair of such threads and each set of stuffer warp-threads comprising two or more, the binder warp-threads and stuffer warp-threads alternating with each other across the fabric and being passed through the same or adjoining spaces of the reed, as desired. The binder warp-threads form successive sheds, each of which is open during the insertion of an entire set of weft-threads, said warp-threads then changing position prior to the introduction of the next set of weft-threads, and the stuffer warp-threads are so disposed in conjunction with the binding warp-threads to form the fabric into two, three, or more plies.

In the fabric shown in Figs. 1 and 19 there are three weft-threads 1, 2, and 3 in each set and two stuffer warp-threads 6 and 7 in each set, the pair of binder warp-threads being represented at 11 and 12, and these threads are so interwoven as to produce a fabric having three plies—namely, a face-ply, an intermediate ply, and a back-ply—one stuffer warp-thread lying between the face-ply and intermediate ply and the other between the intermediate ply and the back-ply and said stuffer warp-threads changing position as the requirements of the pattern may demand. These stuffer warp-threads thus constitute, to a certain extent, a backing for the weft-threads of the front and rear face plies of the fabric and separate them from the weft-threads of the intermediate ply, thereby preventing any grinning or gazing of said intermediate weft-threads through the spaces between the face weft-threads, while at the same time the binder warp-threads serve to confine the weft-threads of the various plies, and thus produce a fabric which is well bound and homogeneous throughout. While the pattern of each face of the fabric is formed mainly by the weft-threads, the stuffer warp-threads are visible to a greater or less extent between the weft-threads of each face of the fabric, and these stuffer warp-threads can therefore be employed to affect the appearance of the pattern produced by the weft-threads by varying the color of said stuffer warp-threads. For instance, the threads 6 may be of the same color as the weft-threads 1 and the threads 7 may be of the same color as the weft-threads 2, and each of said warp-threads 6 and 7 may harmonize in color with the weft-threads 3 or may strongly contrast therewith, or one of said warp-threads may harmonize with said weft-threads 3 and the other may contrast therewith. By proper disposition of the stuffer warp-threads in respect to the face weft-threads, therefore, the effect of said weft-threads in the pattern may be qualified in various ways by the stuffer warp-threads lying behind the same. Thus when the stuffer warp-thread is of the same color as the face weft-thread a solid color effect will be produced, and when said stuffer warp-thread is of a contrasting color a mottled effect will result, and in the case of the weft-threads 3 different effects will be produced, depending upon which of the stuffer warp-threads serves as a backing for said weft-thread when it appears upon the face.

Figure 20:
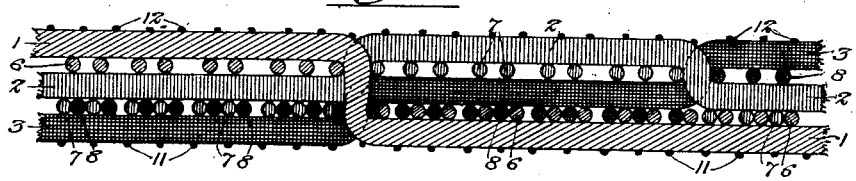

The fabric shown in Figs. 2 and 20 instances the use of stuffer warp-threads in sets of three, numbered, respectively, 6, 7, and 8, and weft-threads also in sets of three, numbered, respectively, 1, 2, and 3, so that upon the front face of the fabric each weft-thread may be backed by a stuffer warp-thread of its own color or by one of either of the other colors, depending upon the color effect desired in the pattern. In this fabric two of the stuffer warp-threads of each set are contained between the intermediate and back face plies of the fabric.

Figure 21:
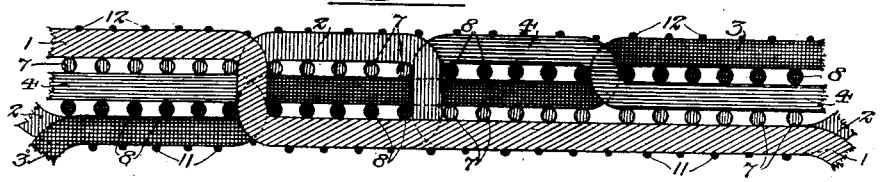

In Figs. 3 and 21 I have shown a fabric in which the weft-threads are in sets of four, numbered, respectively, 1, 2, 3, and 4, and the stuffer warp-threads are in sets of two, numbered, respectively, 7 and 8, this fabric being a three-ply fabric having two weft-threads in each shed of binding warp-threads in the back-face ply, the stuffer warp-threads being disposed between the front-face ply and the intermediate ply and between the intermediate ply and the back-face ply.

Figure 22:
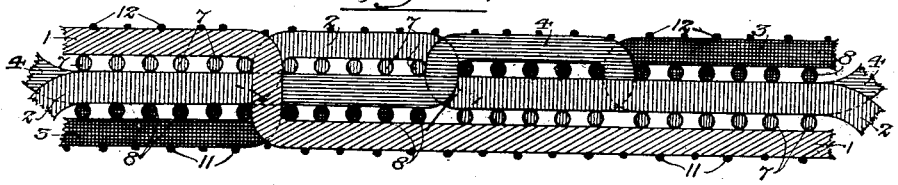

In Figs. 4 and 22 I have shown a fabric similar to that of Figs. 3 and 21 as to the number of threads employed; but in this fabric two of the weft-threads of each set are in the intermediate ply instead of in the back-ply.

Figure 23:
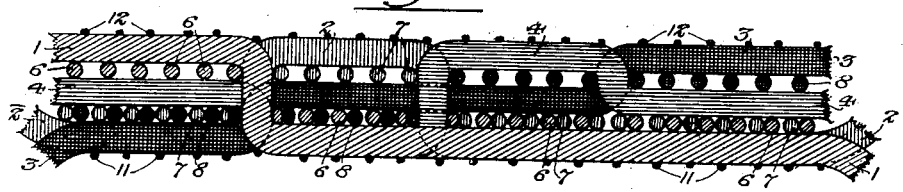

The fabric shown in Figs. 5 and 23 is similar to that shown in Figs. 3 and 21 in having two of the weft-threads of each set contained in a single shed in the back-face ply; but in this fabric the stuffer warp-threads are in sets of three, numbered, respectively, 6, 7, and 8, one thread of each set being disposed between the intermediate ply and the front-face ply, and two threads of each set being disposed between the intermediate ply and the back-face ply.

Figure 24:
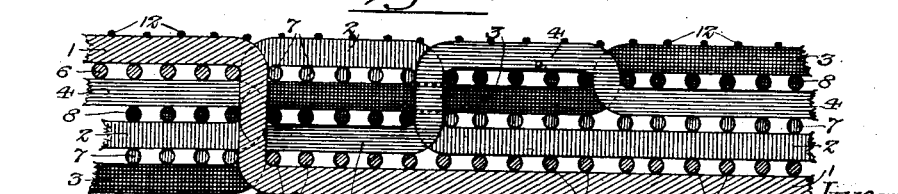

The fabric shown in Figs. 6 and 24 has weft-threads in sets of four, numbered, respectively, 1, 2, 3, and 4, and stuffer warp-threads in sets of three, numbered, respectively, 6, 7, and 8, and these threads are so disposed as to form a four-ply fabric, each ply being separated from the next by one of the stuffer warp-threads.

The fabric shown in Figs. 7 and 25 is a three-ply fabric having both weft-threads and stuffer warp-threads in sets of four, numbered, respectively, 1, 2, 3, and 4, and 6, 7, 8, and 9, two weft-threads of each set being in the back-face ply and one of the stuffer warp-threads of each set being between the intermediate ply and the front-face ply, so as to provide a stuffer warp-thread of corresponding color for each of the weft-threads in said front-face ply, three of the stuffer warp-threads of each set being disposed between the intermediate ply and back-face ply of the fabric.

The fabric shown in Figs. 8 and 26 is similar to that shown in Figs. 7 and 25, with the exception that two of the weft-threads of each set are in the intermediate ply instead of in the back-face ply.

The fabric shown in Figs. 9 and 27 has weft-threads and stuffer warp-threads each in sets of four, numbered, respectively, 1, 2, 3, and 4, and 6, 7, 8, and 9, said stuffer warp-threads being so disposed as to form a four-ply fabric, each of the weft-threads of the front-face ply being backed by a stuffer warp-thread of its own color and two of the stuffer warp-threads of each set being contained between the two intermediate plies of the fabric.

In Figs. 10 and 28 I have illustrated a fabric having the same number of warp and weft threads as that shown in Figs. 9 and 27, but having such a disposition of the stuffer warp-threads that each weft-thread on each face of the fabric is backed by a stuffer warp-thread of corresponding color.

In Figs. 11 and 29 I have illustrated one application of my invention to a fabric having weft-threads in sets of five, numbered, respectively, 1, 2, 3, 4, and 5, this fabric having stuffer warp-threads in sets of two, numbered, respectively, 7 and 8 and disposed so as to form a three-ply fabric with two of the weft-threads of each set in the intermediate ply and two in the back-face ply. The preceding illustrations will render unnecessary any specific showing of this fabric with three, four, or five stuffer warp-threads forming a four or five ply fabric; but it may be noted that when five stuffer warp-threads are employed in a set in this fabric each weft-thread may be backed by a warp-thread of its own color on one or both faces of the fabric.

The fabric shown in Fig. 12 is similar to that shown in Figs. 6 and 24, with the exception that each of the three stuffer warp-threads is used as a backing for the rear-face weft-threads as well as for the front-face weft-threads.

In all of the views of the drawings thus far described I have shown the stuffer warp-threads as changing position only after one or more repetitions of each set of weft-threads, this being due to the fact that corresponding weft-threads appear side by side on both faces of the fabric; but this is not essential.

None of the fabrics thus far described has less than three plies, nor have either of them more than one of the stuffer warp-threads of each set used at one time as a backing for the front-face weft-threads nor more than one of the weft-threads of a set upon the front face of the fabric. These conditions, however, are not essential to the production of fabric in accordance with my invention, for in either of the fabrics shown more than one of the stuffer warp-threads of a set may be used simultaneously as a backing for the front-face weft-threads, and more than one of the weft-threads of a set may be employed in the front-face ply.

In a fabric having but three weft-threads in a set this would necessarily reduce the fabric to a two-ply fabric, as shown, for instance, in Figs. 13 or 16; but the two-ply construction may also be adopted in fabrics having four or five weft-threads in a set, as shown, respectively, in Figs. 14 and 15 and in Figs. 17 and 18. The fabrics shown in Figs. 13, 14, and 15 have stuffer warp-threads in sets of two, and the fabrics shown in Figs. 16, 17, and 18 resemble those of Figs. 13, 14, and 15, except that the stuffer warp-threads are in sets of three instead of two, and it will be evident that the same method of weaving may be adopted in producing fabrics having four or five stuffer warp-threads in a set. In the two-ply portions of the fabric all of the stuffer warp-threads lie between the two plies and necessarily form a backing for the front-face weft-threads; but, as before indicated, the disposal of two or more of the stuffer warp-threads of a set at one time behind the front-face weft-threads may be adopted in portions of the fabric having three or more plies and irrespective of whether the front-face ply contains one or more of the weft-threads of the set. In most cases each of the stuffer warp-threads will underlie the face weft-threads of two or more successive sets before it changes its position in the fabric, so as to cover the spaces between said successive sets of weft-threads.

Having thus described my invention, I claim and desire to secure by Letters Patent—

1. A woven fabric in which weft-threads in sets of three or more are combined with binding warp-threads and with stuffer warp-threads in sets of two or more, said binding warp-threads passing from one face of the fabric to the other and said stuffer warp-threads changing position between the plies of the fabric whereby either of them may be used as a backing for the face weft-threads, substantially as specified.

2. A woven fabric in which weft-threads in sets of three or more are combined with binding warp-threads and with stuffer warp-threads in sets of two or more disposed so as to form as many plies as there are weft-threads in each set, said binding warp-threads passing from one face of the fabric to the other and the stuffer warp-threads changing position in respect to the plies whereby either of said stuffer warp-threads may be used as a backing for the face weft-threads, substantially as specified.

3. A woven fabric in which weft-threads in sets of three or more are combined with binding warp-threads and with stuffer warp-threads in sets each having as many threads as there are weft-threads in a set, said stuffer warp-threads changing position in respect to the plies of the fabric whereby the face weft-threads can be backed by stuffer warp-threads either of their own color or of a different color, substantially as specified.

4. A woven fabric in which weft-threads in sets of three or more are combined with binding warp-threads and with stuffer warp-threads in sets each comprising as many threads as there are weft-threads in a set, said stuffer warp-threads being disposed so as to form as many plies in the fabric as there are weft-threads in a set and changing position in respect to the plies whereby the face weft-threads can be backed either by stuffer warp-threads of their own color or of a different color, substantially as specified.

5. A woven fabric in which weft-threads in sets of three or more are combined with binding warp-threads and with stuffer warp-threads in sets of two or more, the weft-threads being so disposed as to form more plies in some portions of the fabric than in others, and the stuffer warp-threads changing position between the plies, substantially as specified.

6. A woven fabric in which weft-threads in sets of three or more are combined with binding warp-threads and with stuffer warp-threads in sets of two or more, said stuffer warp-threads changing position between the plies of the fabric, and stuffer warp-threads of the same set lying side by side in the same ply in some portions of the fabric, substantially as specified.

7. A woven fabric in which weft-threads in sets of three or more are combined with binding warp-threads and with stuffer warp-threads in sets of two or more, said weft-threads being so disposed as to form more plies in some portions of the fabric than in others, and the stuffer warp-threads changing position between the plies of the fabric, stuffer warp-threads of the same set lying side by side in the same ply in some portions of the fabric, substantially as specified.

8. A woven fabric in which weft-threads in sets of three or more are combined with binding warp-threads and with stuffer warp-threads in sets of two or more, said stuffer warp-threads separating the weft-threads into plies and the weft-threads being so disposed that sometimes one and sometimes more than one of the threads of the set are in the face-ply of the fabric, substantially as specified.

In testimony whereof I have signed my name to this specification in the presence of two subscribing witnesses.

HARRY HARDWICK.

Witnesses:
F. E. BECHTOLD,
JOS. H. KLEIN.